(12) United States Patent
Chase

(10) Patent No.: US 11,485,246 B1
(45) Date of Patent: Nov. 1, 2022

(54) INDIVIDUALIZED VEHICULAR CHARGING MAT

(71) Applicant: Arnold Chase, West Hartford, CT (US)

(72) Inventor: Arnold Chase, West Hartford, CT (US)

( * ) Notice: Subject to any disclaimer, the term of this patent is extended or adjusted under 35 U.S.C. 154(b) by 0 days.

(21) Appl. No.: 17/222,228

(22) Filed: Apr. 5, 2021

(51) Int. Cl.
| | |
|---|---|
| *H01F 27/42* | (2006.01) |
| *H01F 37/00* | (2006.01) |
| *H01F 38/00* | (2006.01) |
| *B60L 53/36* | (2019.01) |
| *B60L 53/122* | (2019.01) |
| *B60L 53/39* | (2019.01) |
| *B60L 53/65* | (2019.01) |
| *H02J 50/10* | (2016.01) |

(52) U.S. Cl.
CPC ............. *B60L 53/36* (2019.02); *B60L 53/122* (2019.02); *B60L 53/39* (2019.02); *B60L 53/65* (2019.02); *H02J 50/10* (2016.02)

(58) Field of Classification Search
CPC ........ B60L 53/122; B60L 53/36; B60L 53/39; B60L 53/65; E04H 6/426; H02J 50/10
See application file for complete search history.

(56) References Cited

U.S. PATENT DOCUMENTS

| | | | |
|---|---|---|---|
| 4,347,472 A * | 8/1982 | Lemelson ............... | B60L 53/14 320/108 |
| 5,617,003 A | 4/1997 | Odachi et al. | |
| 5,821,731 A * | 10/1998 | Kuki ....................... | B60L 53/31 320/108 |
| 6,525,510 B1 * | 2/2003 | Ayano ..................... | B60L 53/31 320/109 |
| 8,729,859 B2 | 5/2014 | Cook et al. | |
| 9,287,720 B2 | 3/2016 | Kawamura | |
| 9,333,870 B2 | 5/2016 | Kume et al. | |
| 9,381,878 B2 | 7/2016 | Ichikawa | |
| 9,409,491 B2 | 8/2016 | Ichikawa et al. | |

(Continued)

FOREIGN PATENT DOCUMENTS

| | | |
|---|---|---|
| CN | 104810906 A | 7/2015 |
| CN | 106671811 A | 5/2017 |

(Continued)

OTHER PUBLICATIONS

Wireless Power Transfer for Light-Duty Plug-in/Electric Vehicles and Alignment Methodology, SAE International, J2954, Apr. 2019, pp. 1-172.

(Continued)

*Primary Examiner* — Daniel Cavallari
*Assistant Examiner* — Rasem Mourad
(74) *Attorney, Agent, or Firm* — McCormick, Paulding & Huber PLLC

(57) ABSTRACT

An individualized vehicular charging mat includes a body defining two tire channels terminating at respective channel ends, and a wireless charging element arranged within or on top of the body. The two tire channels include respective entrances at a side edge of the body, and are separated by a track width for a particular vehicle make, model and model year(s). The wireless charging element is arranged at a location where the wireless charging element is configured to optimally charge a vehicle of the particular vehicle make, model and model year(s) when tires of the vehicle come to rest at the channel ends.

26 Claims, 4 Drawing Sheets

(56) References Cited

U.S. PATENT DOCUMENTS

| | | | |
|---|---|---|---|
| 9,505,314 B2 | 11/2016 | Widmer | |
| 9,577,440 B2 | 2/2017 | Partovi et al. | |
| 9,577,466 B2 | 2/2017 | Ku et al. | |
| 9,581,997 B1 | 2/2017 | Penilla et al. | |
| 9,637,014 B2 | 5/2017 | Schneider et al. | |
| 9,643,505 B2 | 5/2017 | Ichikawa et al. | |
| 9,649,948 B2 | 5/2017 | Bell et al. | |
| 9,694,685 B2 | 7/2017 | Ricci | |
| 9,725,004 B2 | 8/2017 | Asai et al. | |
| 9,758,048 B2 | 9/2017 | Ueda | |
| 9,772,401 B2 | 9/2017 | Widmer et al. | |
| 9,780,574 B2 | 10/2017 | Niizuma | |
| 9,873,346 B2 | 1/2018 | Maekawa | |
| 9,902,278 B2 | 2/2018 | Maekawa | |
| 9,908,425 B2 | 3/2018 | Prokhorov | |
| 9,925,883 B2 | 3/2018 | Bell et al. | |
| 9,969,287 B2 | 5/2018 | Roberts et al. | |
| 10,042,359 B1 | 8/2018 | Konrardy et al. | |
| 10,044,235 B2 | 8/2018 | Takatsu et al. | |
| 10,071,644 B2 | 9/2018 | Wechsler et al. | |
| 10,086,715 B2 | 10/2018 | Lewis et al. | |
| 10,236,727 B2 | 3/2019 | Takatsu et al. | |
| 10,300,805 B2 | 5/2019 | Halker et al. | |
| 10,343,532 B2 | 7/2019 | Yuasa | |
| 10,427,549 B2 | 10/2019 | Yang et al. | |
| 10,457,158 B2 | 10/2019 | Namou et al. | |
| 10,464,432 B2 | 11/2019 | Katanoda | |
| 10,562,396 B2 | 2/2020 | Tokura | |
| 10,668,829 B2 | 6/2020 | Von Novak, III et al. | |
| 10,688,875 B2 | 6/2020 | Iwai et al. | |
| 10,766,373 B2 | 9/2020 | Nishio et al. | |
| 10,850,634 B2 | 12/2020 | Wang et al. | |
| 11,005,310 B2 | 5/2021 | Konschak et al. | |
| 2009/0096413 A1 | 4/2009 | Partovi et al. | |
| 2009/0286476 A1* | 11/2009 | Toncich | H01F 38/14 455/41.1 |
| 2010/0017249 A1 | 1/2010 | Fincham et al. | |
| 2010/0235006 A1* | 9/2010 | Brown | B60L 53/124 700/286 |
| 2011/0181240 A1* | 7/2011 | Baarman | G01R 29/0814 320/108 |
| 2011/0187317 A1* | 8/2011 | Mitake | B60L 5/005 320/108 |
| 2012/0261481 A1* | 10/2012 | Donlan | F24D 19/10 237/12 |
| 2012/0319644 A1 | 12/2012 | Hu et al. | |
| 2014/0125144 A1 | 5/2014 | Nakamura et al. | |
| 2014/0232336 A1 | 8/2014 | Kepka | |
| 2014/0252874 A1 | 9/2014 | Niizuma | |
| 2014/0257614 A1 | 9/2014 | Niizuma | |
| 2015/0091511 A1 | 4/2015 | Ichikawa | |
| 2015/0123489 A1* | 5/2015 | Niizuma | H02J 50/10 307/104 |
| 2015/0137744 A1* | 5/2015 | Lee | B60L 53/37 320/108 |
| 2015/0145472 A1 | 5/2015 | Kees et al. | |
| 2015/0170814 A1 | 6/2015 | Blum et al. | |
| 2016/0052406 A1 | 2/2016 | Ohashi et al. | |
| 2016/0089987 A1 | 3/2016 | Ichikawa et al. | |
| 2016/0114686 A1* | 4/2016 | Beattie, Jr | B60L 11/182 320/108 |
| 2016/0325631 A1 | 11/2016 | Lannoije et al. | |
| 2017/0009476 A1* | 1/2017 | Vernon | B60L 53/51 |
| 2017/0012474 A1 | 1/2017 | Takatsu et al. | |
| 2017/0170690 A1 | 6/2017 | Shijo et al. | |
| 2017/0259682 A1 | 9/2017 | Oettle et al. | |
| 2018/0262059 A1* | 9/2018 | Apostolos | H02J 50/27 |
| 2019/0048533 A1* | 2/2019 | Anthony | E01C 11/245 |
| 2020/0180447 A1 | 6/2020 | Nishimura et al. | |
| 2020/0251929 A1 | 8/2020 | Partovi | |
| 2020/0269714 A1 | 8/2020 | Leibetseder et al. | |
| 2021/0061117 A1 | 3/2021 | Singuru et al. | |
| 2021/0197677 A1 | 7/2021 | Terada | |

FOREIGN PATENT DOCUMENTS

| | | |
|---|---|---|
| CN | 107199897 A | 9/2017 |
| CN | 107813726 A | 3/2018 |
| CN | 108177546 A | 6/2018 |
| CN | 108437825 A | 8/2018 |
| CN | 108437838 A | 8/2018 |
| CN | 108819788 A | 11/2018 |
| CN | 109004698 A | 12/2018 |
| CN | 109664778 A | 4/2019 |
| CN | 110027416 A | 7/2019 |
| CN | 110053499 A | 7/2019 |
| CN | 110126649 A | 8/2019 |
| CN | 110435450 A | 11/2019 |
| EP | 3315351 A2 | 5/2018 |
| KR | 102127167 B1 | 6/2020 |
| WO | 2010098412 A1 | 2/2010 |
| WO | 2010090333 A1 | 8/2010 |
| WO | 2013145581 A1 | 3/2013 |
| WO | 2012169197 A1 | 2/2015 |
| WO | 2015158589 A1 | 10/2015 |
| WO | 2018196385 A1 | 1/2018 |
| WO | 2019053676 A1 | 3/2019 |
| WO | 2019082076 A1 | 5/2019 |
| WO | 2019097900 A1 | 5/2019 |
| WO | 2020078982 A1 | 4/2020 |

OTHER PUBLICATIONS

Wireless Power Transfer for Light-Duty Plug-in/Electric Vehicles and Alignment Methodology, SAE International, J2954, Nov. 2017, pp. 1-150.

Wireless Power Transfer for Light-Duty Plug-in/Electric Vehicles and Alignment Methodology, SAE International, J2954, May 2016, pp. 1-115.

Use Cases for Wireless Charging Communication for Plug-in Electric Vehicles, SAE International, J2836/6, May 2013, pp. 1-20.

Wireless Power Transfer for Light-Duty Plug-in/Electric Vehicles and Alignment Methodology, SAE International, J2954, Oct. 2020, pp. 1-194.

Use Cases for Wireless Charging Communication for Plug-in Electric Vehicles, SAE International, J2836/6, Apr. 2021, pp. 1-20.

* cited by examiner

INDIVIDUALIZED VEHICULAR CHARGING MAT

TECHNICAL FIELD

The present disclosure relates to wireless charging devices and, more particularly, wireless charging devices specifically configured to be paired to a particular vehicle make, vehicle model and vehicle year to effectuate passive optimized alignment for vehicle wireless charging optimization.

BACKGROUND

While in recent years there has been a trend towards standardizing electric vehicle ("EV") plug-in configurations, standardizing the physical configuration of wireless charging configurations to accommodate various makes and models of electric vehicles, e.g. location of charging coils on a vehicle, height of charging coils above the ground, etc., has not matched the same degree of progress to allow ease in charging various electric vehicle models. Due to various physical differences among different electric vehicles, wireless chargers have typically been equipped with complex positioning mechanisms to align charging coils to the position of vehicular receiving coils among various electric vehicles.

SUMMARY

The present disclosure provides individualized vehicular charging mats ("IVCM"), that are uniquely physically optimized and paired for a particular vehicle make, particular vehicle model, and particular model year(s).

In accordance with embodiments of the present disclosure, an individualized vehicular charging mat includes a body defining two tire channels terminating at respective channel ends, and a wireless charging element arranged within or on top of the body. The two tire channels include respective entrances at a side edge of the body, and are separated by a track width for a particular vehicle make, model and model year(s). The wireless charging element is arranged at a location where the wireless charging element is configured to charge a vehicle of the particular vehicle make, model and model year(s) when tires of the vehicle come to rest at the channel ends.

In accordance with embodiments of the present disclosure, the wireless charging element is arranged at a specific location where the wireless charging element is optimally configured to charge a vehicle of the particular vehicle make, model and model year(s) when vehicle comes to rest at a resting position on the body.

In accordance with embodiments of the present disclosure an individualized vehicular charging mat system includes a first individualized vehicular charging mat and a second individualized charging mat, each individualized vehicular charging mat including a body defining two tire channels terminating at respective channel ends, a wireless charging element arranged within or on top of the body. The wireless charging element of the first individualized vehicular charging is arranged at a location to charge a first vehicle of a first particular vehicle make, model and model year(s), and the wireless charging element of the second individualized vehicular charging mat is configured to charge a second vehicle of a second particular vehicle make, model and model year(s). The first and second particular vehicle makes, models and model year(s) may be the same or different.

DETAILED DESCRIPTION

Figure 1A:
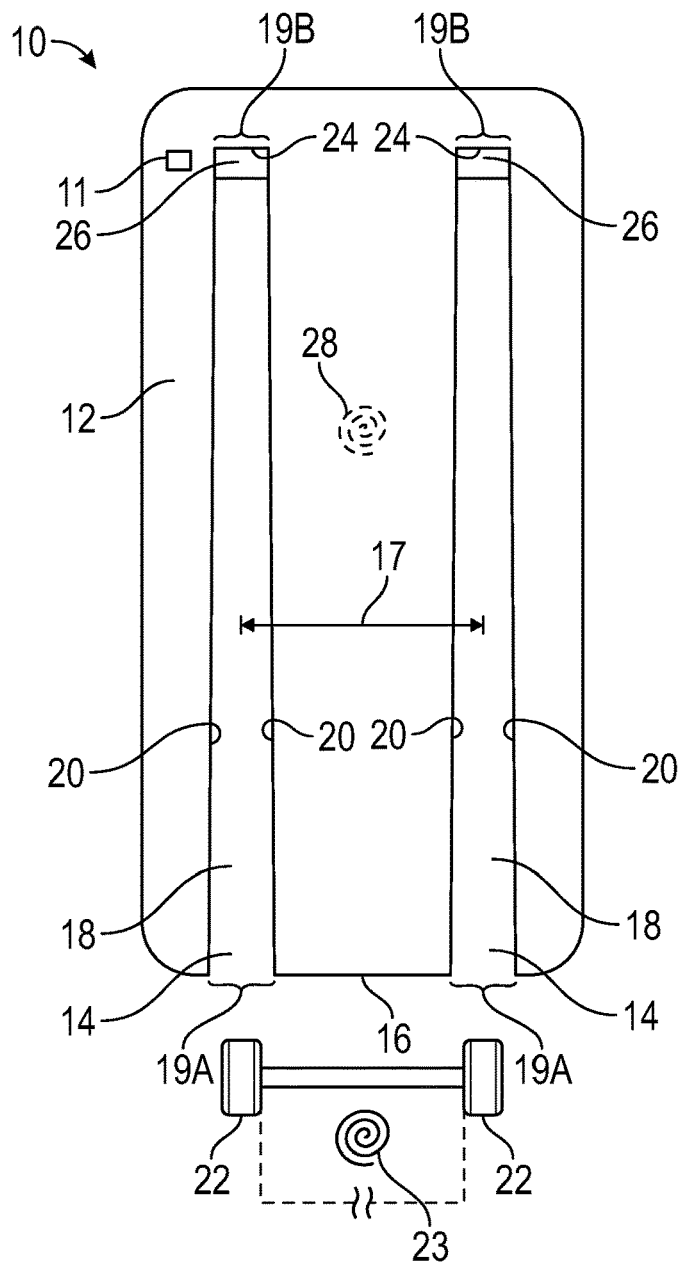
FIG. 1A shows a top view of an individualized vehicular charging mat with a vehicle about to enter into the IVCM in accordance with the present disclosure.

Before the various embodiments are described in further detail, it is to be understood that the invention is not limited to the particular embodiments described. It is also to be understood that the terminology used is for the purpose of describing particular embodiments only, and is not intended to limit the scope of the claims of the present application.

In the drawings, like reference numerals refer to like features of the individualized vehicular charging mat devices and systems of the present application. Accordingly, although certain descriptions may refer only to certain figures and reference numerals, it should be understood that such descriptions might be equally applicable to like reference numerals in other figures. Additionally, although various features have been shown in different figures for simplicity, it should be readily apparent to one of skill in the art that the various features may be combined without departing from the scope of the present disclosure.

Referring to FIGS. 1A-2B, an exemplary IVCM 10 is shown according to the present disclosure. The IVCM 10 comprises a body 12 having a height 13, the body 12 defining two tire entrances 14 at a front edge 16 of the IVCM 10. The tire entrances 14 provide a pathway to two tire channels 18 defined by the IVCM 10 that narrow (or taper) in a direction away from the side edge 16 such that the tire channels 18 have a gap 19A between side walls 20 of the tire channels 18 at a point closest to the side edge 16. The tire channels 18 extend parallel to each other and are separated by a fixed center separation distance 17 from their respective centers The tire channels 18 terminate at channel ends 24. The IVCM 10 comprises a controller 11 embedded in the body 12, two stopping blocks 26 forming the channel ends 24, and a wireless charging element in the form of a wireless charging coil 28 arranged between the tire channels 18. The wireless charging coil 28 is operatively connected to the controller 11 through a wired and/or wireless connection(s) and operatively connected to a power source (not shown). The gap 19B between the side walls 20 at the stopping blocks 26 is smaller than the gap 19A (FIG. 1) between the side walls 20 at the side edge 16. The stopping blocks 26 may have a height greater than the height 13 of the body 12 to prevent vehicular travel beyond the stopping blocks 26 or the resting position.

Figure 1B:
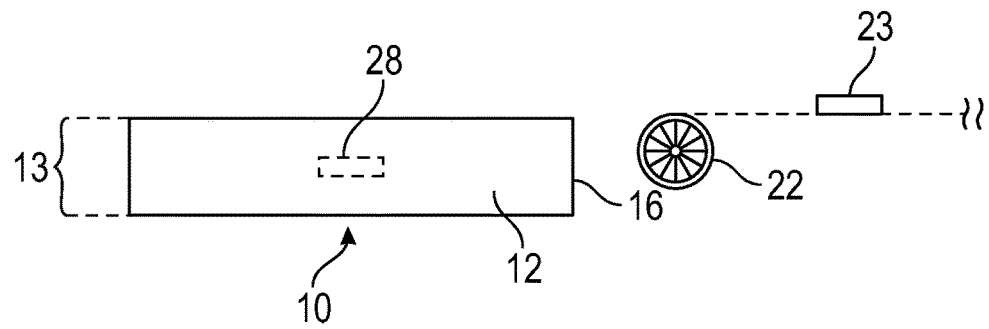
FIG. 1B shows a side view of the individualized vehicular charging mat and vehicle of FIG. 1A in accordance with the present disclosure
Figure 2A:
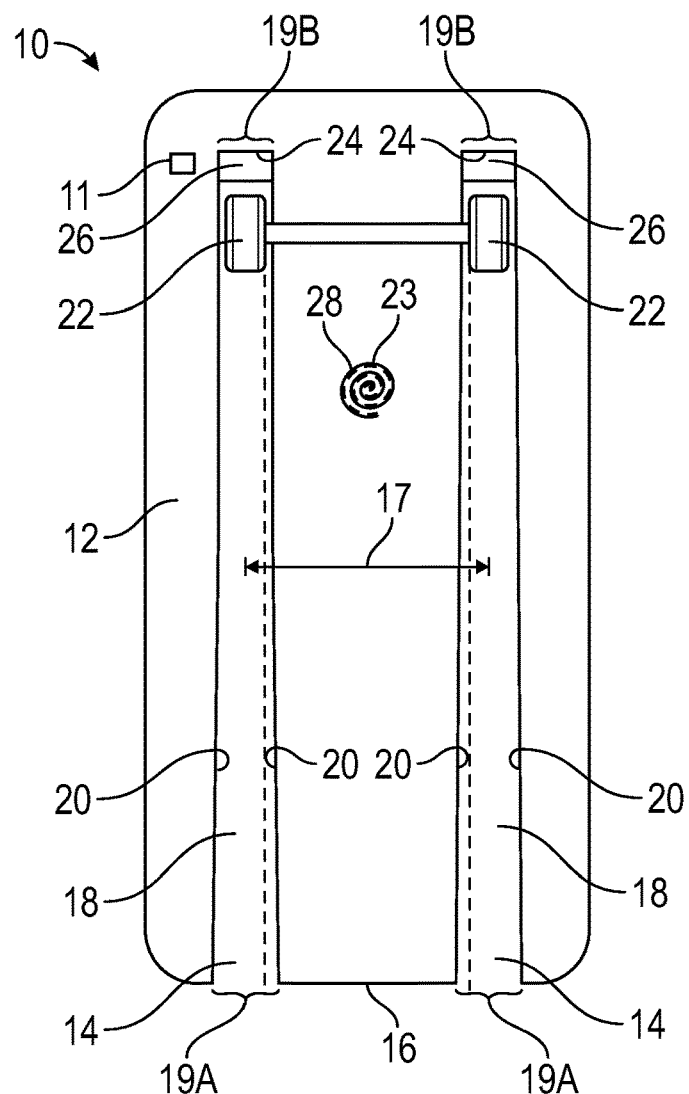
FIG. 2A shows a top view of the individualized vehicular charging mat of FIG. 1A with a vehicle advanced into the individualized vehicular charging mat in accordance with the present disclosure.
Figure 2B:
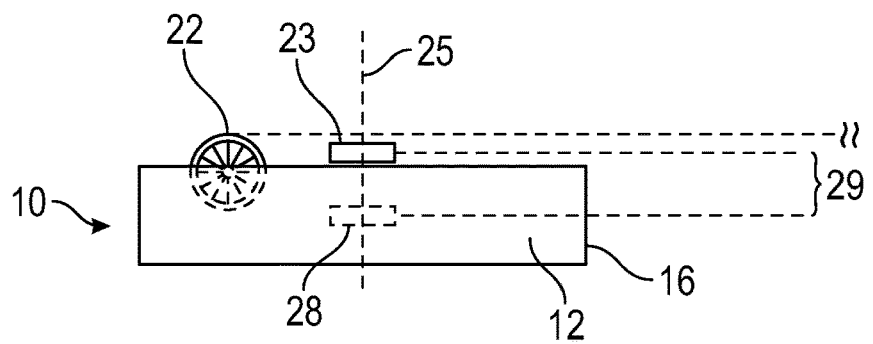
FIG. 2B shows a side view of the individualized vehicular charging mat and vehicle of FIG. 2A in accordance with the present disclosure.

A pair of tires 22 of a vehicle with an associated receiving charging coil 23 of the vehicle are shown with the tires 22 about to enter the tire entrances 14 in FIGS. 1A and 1B. In FIGS. 2A and 2B, the vehicle tires 22 are shown as being advanced to the stopping blocks 26. In operation, when the vehicle tires 22 come to rest at or near the stopping blocks 26, the vehicle is in a resting position, which may be referred to as a charging position. In the resting position, the vehicle receiving charging coil 23 is aligned with the wireless charging coil 28 such that an alignment axis 25 extends substantially through the center of both the receiving charging coil 23 and the wireless charging coil 28, the alignment axis 25 being substantially perpendicular to a longitudinal extension of the body 12 of the IVCM 10. When in the resting position (FIG. 2B), the receiving charging coil 23 is at a distance 29 above the wireless charging coil 28 optimized for a charging session.

Advantageously, the IVCM 10 is specifically configured for a particular vehicle make/model and for a particular year(s) of the particular vehicle make/model. An IVCM 10 being "specifically configured" for a particular year(s) of the particular make/model means that the wireless charging coil 28 is arranged at a predetermined position in (or above) the body 12 such that the receiving charging coil 23 of a vehicle of the particular make/model and particular year(s) is aligned with the wireless charging coil 28 when the vehicle comes to a resting position on the stopping blocks 26, the height 13 of the body 12 is predetermined to not interfere with elements of the vehicle as the vehicle advances into the IVCM 10 (in other words, the vehicle make/model and year(s) has an undercarriage clearance greater than the height 13 of the body 12), and separation distance 17 of tire channel 18 centers is substantially equal (or equal) to the tire track width (i.e. the distance between center points of the tires 22 of the vehicle). Thus, the IVCM 10 is specifically configured to be optimized to charge the receiving charging coil of the particular make/model of the vehicle. The drawings are illustrative of the novel IVCM 10 elements, but the size and/or shape of elements may be different than as shown, and the relative spacing between elements may be different than as shown. For example, in practice, the distance between the wireless charging coil 28 and the receiving charging coil 23 may be much smaller than shown in order to make wireless charging more efficient and/or practical. Further, in some embodiments, the wireless charging coil 28 may be arranged above the body 12 on a stand in order to make the relative distance between charging coils 28, 23 within a required or desired distance.

The gap 19A is configured to be wider than the outside sidewall to sidewall width of the stock tire(s) (default tire(s)) of the particular vehicle make/model and particular year(s) of the vehicle to which the IVCM 10 is optimized to charge, or wider than a maximum recommended tire width for the particular vehicle make/model and particular year(s).

Figure 3:
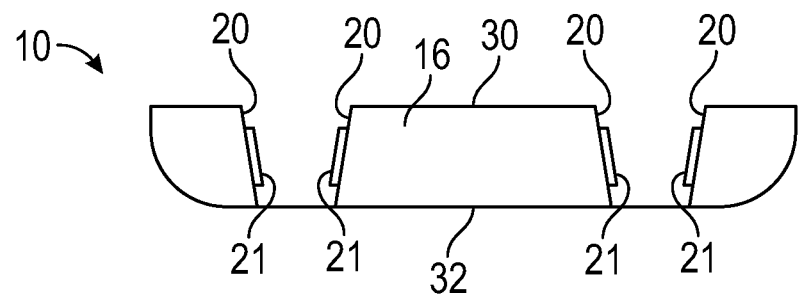
FIG. 3 shows a front view of the individualized vehicular charging mat of FIG. 1A in accordance with the present disclosure.

Referring to FIG. 3, a front view of the IVCM 10 of FIG. 1 is shown according to the present disclosure. The IVCM 10 is shown with optional side wall plates 21 arranged on the tire channel 18 side walls 20. The side wall plates 21 serve as glide plates that guide tires 22 of a vehicle when the vehicle advances into the IVCM 10. The side wall plates 21 may be made of smooth materials and/or low-friction materials such as, for example and without limitation, Teflon®, smooth plastics or polished metal strips to minimize rolling resistance between the charging mat 10 and the corresponding vehicle's tires 22.

In addition to the tire channels 18 tapering or narrowing in a direction away from the side edge 16, the tire channels 18 also taper or narrow in a direction away from a top face 30 of the IVCM 10 as shown in FIG. 3. Thus, the gap between the side walls 20 (e.g. gaps 19A, 19B of FIGS. 1 and 2) is larger at the top face 30 than at a bottom edge 32 opposite the top face 30. The tapering or narrowing of the side walls 20 in the direction away from the top face 30 may optionally decrease in a direction towards the tire channel ends 24 and, in some embodiments, the side walls 20 may be vertical or substantially vertical at and/or near the stopping blocks 26 instead of angled (i.e. perpendicular to the ground or tire channel 18 bottom). The combination of the tire channel 18 width narrowing from gap 19A to gap 19B and/or increase of tire channel 18 angle of the side walls 20 increasing to perpendicular (i.e. 90°) function to force the vehicle tires 22 to self-center within each tire channel 18 until the resting position is reached.

Figure 4:
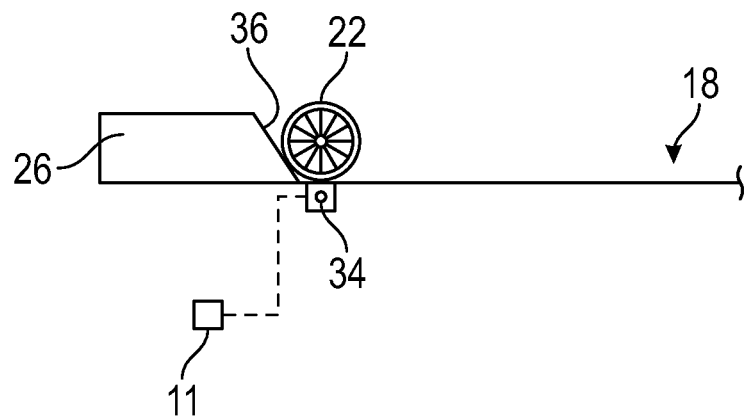
FIG. 4 shows a side profile of a tire channel of the individualized vehicular charging mat of FIG. 1A in accordance with the present disclosure.

Referring to FIG. 4, a side profile of a tire channel 18 of the IVCM 10 of FIG. 1 is shown according to the present disclosure with an optional occupancy sensor 34. The occupancy sensor 34 is operatively connected to the controller 11 through a wired and/or wireless connection(s). The occupancy sensor 34 may be a weight sensor, optical sensor, and/or any other type of positional sensor configured to detect the presence of a tire or vehicle. In some embodiments, the occupancy sensor 34 is molded into the body 12 of the IVCM 10 and operatively connected to the charging circuitry of the IVCM 10. Upon detection of a tire or vehicle or, if necessary, upon required authorization or payment transactions or procedures following detection of the tire or vehicle, the controller 11 is configured to initiate a charging session by causing the wireless charging coil 28 to become activated, i.e. causing power to flow through the wireless charging coil 28 to induce a current in receiving charging coil 23 of the vehicle through known wireless charging systems and methods. As shown in FIG. 4, the stopping block 26 may have an angled surface 36 facing the tire channel 18.

Figure 5:
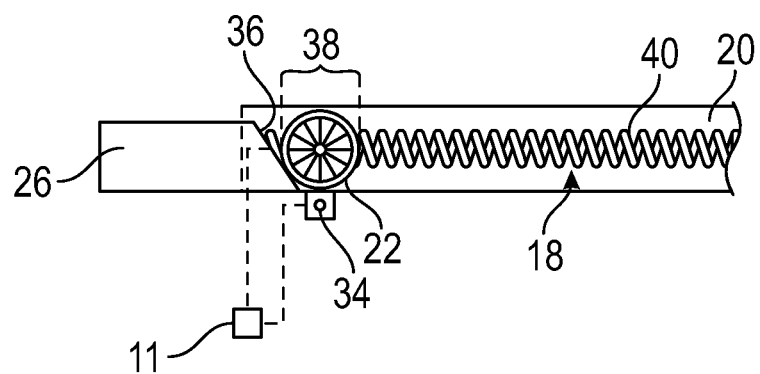
FIG. 5 shows a side profile of a tire channel of the individualized vehicular charging mat of FIG. 1A in accordance with the present disclosure.

Referring to FIG. 5, a side profile of the tire channel 18 of the IVCM 10 of FIG. 1 is shown according to the present disclosure with an optional tire well 38. The tire well 38 is configured as a bottom depression for receiving a tire 22. One or more of the tire channels 18 may have the optional tire well 38. When receiving a tire 22 of a vehicle in the tire well 38, the vehicle will be in a position that is optimized for charging the vehicle with the wireless charging coil 28 because a receiving charging coil of the vehicle will be optimally positioned to be charged.

The tire channel 18 also includes an optional heating wire(s) 40 embedded in the side wall(s) 20 and operatively connected to the controller 11. The optional heating wire(s) 40 allows for thermostatically controlled operation to heat the tire channel 18, the body 12 in the area of the tire channel 18, or the body 12 generally if being operated in a freezing temperature environment, which may be measured by a temperature sensor of the controller 11. Heating the body 12 and/or the tire channels 18 may minimize the effects of snow and/or ice from interfering with alignment and subsequent optimal charging of a vehicle in the IVCM 10.

Referring to FIGS. 1-5, in operation, a vehicle may advance into the IVCM 10 by tires 22 of the vehicle entering the tire entrances 14. Since the size and shape of the tire channels 18 guide the vehicle tires 22, a driver would effectively be able to drive the vehicle with a hands-off steering wheel approach when moving the vehicle to the resting position or charging position if the vehicle is a driven vehicle. The tire channels 18 are configured to passively guide a vehicle entering the tire channels 18 through the entrances 14 to the resting position as no active movement of any alignment parts are needed to guide the vehicle. Once the in the resting position, the driver could manually activate the IVCM 10 to initiate a charging session or the charging session could become automatically initiated based on a detection that the vehicle is in the resting position and/or ready to be charged.

The detection of the presence of the vehicle may be accomplished with the use of one or more sensors, e.g. occupancy sensor 34. However, a dedicated occupancy sensor is not required. In some embodiments, as an electric vehicle drives over the wireless charging element 28, short pulses of charging energy are sent to the moving electric vehicle from the wireless charging element 28, which may be initiated and/or controlled by the controller 11. The controller 11 and/or a controller of the vehicle may monitor the amount of charging current sent to, and/or received by, the vehicle. When the charging current is observed by the controller 11 to have risen to a predetermined threshold or to a peak point, the vehicle is in an optimum or acceptable position for being charged and the controller 11 may be configured to initiate a charging session automatically (or after payment/authorization steps if necessary or desired). If the controller 11 or if vehicle controller determines that the charging current has not risen to a predetermined threshold, a charging session may be restricted from being initiated. Thus, a controller 11 may be able to determine if an electric vehicle is present by periodically emitting short-duration pulses of energy, for example and without limitation, emitting a short-duration pulse of energy every one minute, two minutes, five minutes, or any interval of time within one to ten minutes. If an increase in power flowing through the wireless charging element 28 and/or the receiving charging element 23 is detected beyond nominal eddy losses, then the controller 11 may determine that the electric vehicle is in the resting position (or charging position) and the controller 11 may initiate charging without human input. In some embodiments, if the vehicle does not respond to the pulses of energy then the vehicle is not eligible to be charged at the IVCM and/or the vehicle is not of an appropriate vehicle make, model and model year(s).

The wireless charging coil 28 may be fixed (i.e. stationary) and in an optimal position for charging a receiving charging coil 23 when a vehicle is in the resting position without further movement and/or adjustment of the wireless charging coil 28 and/or receiving charging coil 23. However, in some embodiments, there may be the provision for upward movement of the wireless charging coil 28 if, for example, there was a front body feature such as a low bumper or air-dam that was located at a point lower than the bottom of the vehicle's charging coil. For example and without limitation, the wireless charging coil 28 may be raised in order to decrease the relative distance between the wireless charging coil 28 and receiving charging coil 23 once the vehicle is in the final position. Since the IVCM is matched to a specific vehicle whose physical characteristics are known, upon a receipt of the front wheels being in "final" (charging) position, the IVCM controller would raise the charging coil 28 to its optimum height position for charging and then automatically retract said charging coil 28 when the charging session was finished, or in the case of a vehicle being prematurely moved out of its charging position. Ideally the motor drive of the raising mechanism would be a "spring return" design which would rapidly retract back to its "home" position.

In some embodiments, the body 12 of the IVCM 10 is made of dense heavy-duty rubber material that is typically used for wheel blocks, wheel stops, etc., but other materials may be used, such as lighter weight materials. Lighter weight materials may be secured to a base surface to give sufficient support or rigidity of the IVCM 10. In some embodiments, the active components of the IVCM 10, such as the controller 11, wireless charging coil 28, and occupancy sensor 34 are molded into the body 12, which advantageously may prevent the active components from being undesirably moved or damaged from the effects of weather, moisture, etc. In other embodiments, the active components are modular in the sense that the active components are nested into a covered opening in the body 12 that allows for easy replacement and/or maintenance when needed or desired.

In some embodiments, an individualized vehicle charging mat system comprises a plurality of IVCMs 10 are arranged in a vehicle charging area. In some embodiments, each of the plurality of IVCMs 10 of the system may be configured to charge the same particular vehicle make, model and model year(s). In some embodiments, each of the plurality of IVCMs 10 of the system may be configured to charge a different particular vehicle make, model and model year(s).

While the stopping blocks 26 have been shown with an angled surface 36 making a specific angle with respect to the ground, it is within the scope of the present disclosure for the angled surface 36 to make virtually any angle. For example and without limitation, the angled surface 36 could be vertically oriented, i.e. have an angle of 90° with respect to the ground, or the angled surface 36 could have an angle of 45° with respect to the ground.

While the controller 11 has been shown and described as being embedded in the IVCM 10 body 12, it is within the scope of the present disclosure for the controller 11 to be separate from the body 12. Further, it is within the scope of the present disclosure for a plurality of IVCMs 10 or a plurality of bodies 12 to share a common controller 11.

While the receiving charging coil 23 and the wireless charging coil 28 have been shown as being substantially the same size and shape, it is within the scope of the present disclosure for the coils 23, 28 to have different sizes and/or shapes. Further, while it has been shown and described that the alignment axis 25 extends substantially through the center of both the coils 23, 28 when the vehicle reaches the resting position (or charging position), it is within the scope of the present disclosure for the coils 23, 28 not to have their centers aligned with the alignment axis if the particular vehicle and the corresponding charging mat alignment configuration is optimized while at an offset to the centerline of the vehicle.

Figure 6:
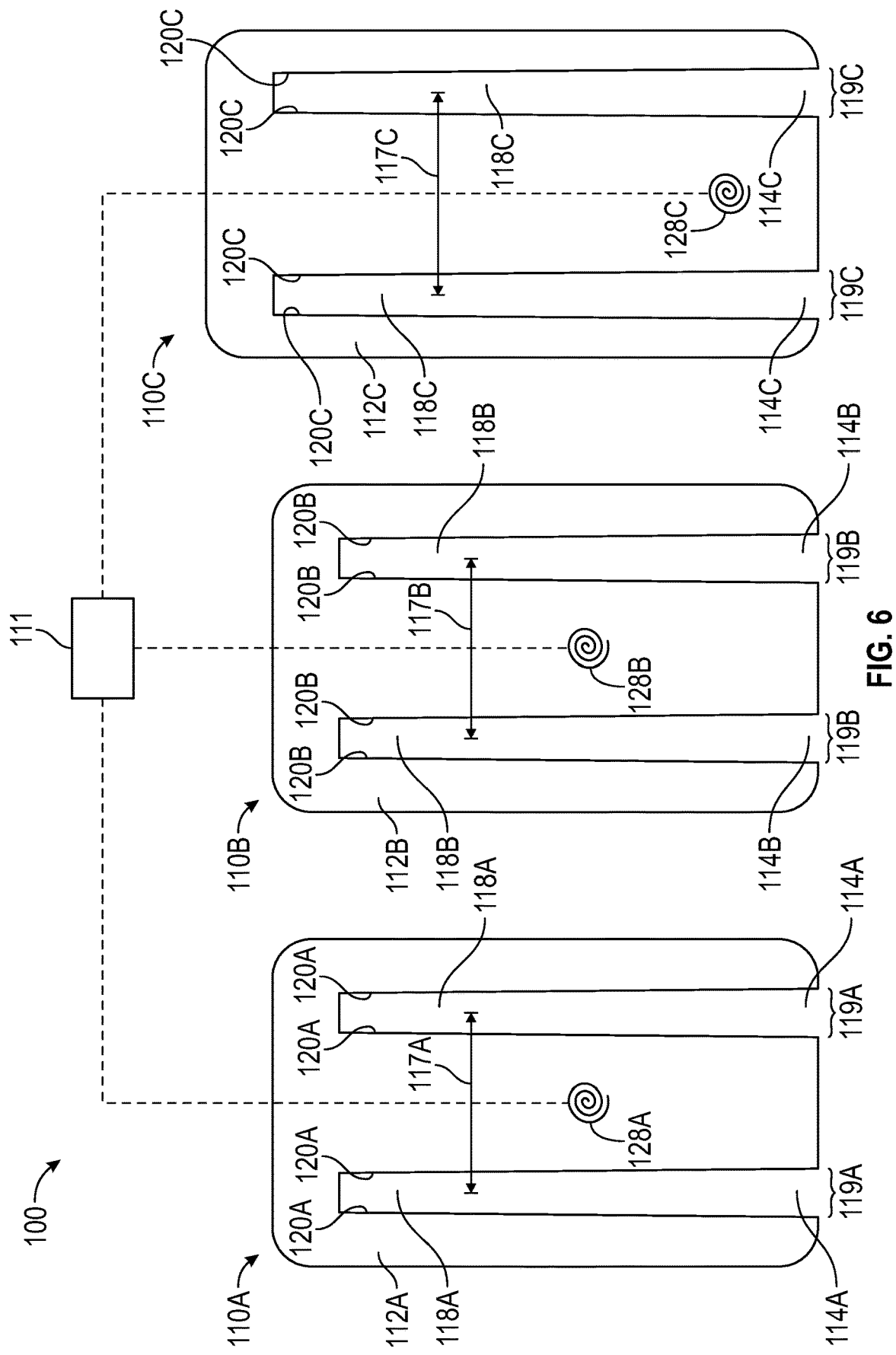
FIG. 6 shows an individualized vehicular charging mat system in accordance with the present disclosure.

Referring to FIG. 6 an individualized vehicular charging mat system 100 is shown in accordance with the present disclosure. The IVCM system 100 includes a first IVCM 110A, a second IVCM 110B, and a third IVCM 110C. The IVCM system 100 further comprises a common controller 111 operatively connected to the wireless charging coil 128A, 128B, 128C of each IVCM 110A, 110B, 110C. However, as discussed above, each IVCM 110A, 110B, 110C may comprise its own dedicated controller. The separation distance 117A between tire channels 118A of the first IVCM 110A is equal to the separation distance 117B between tire channels 118B of the second IVCM 110B, but is less than the separation distance 117C of tire channels 118C of the third IVCM 110C. The location and arrangement of the first and second wireless charging elements 128A, 128B of the first and second IVCMs 110A, 110B are the same (i.e. X/Y/Z coordinate of the charging elements 128A, 128B in the context of each IVCM 110A, 110B are the same), but are different than the location and arrangement of the third wireless charging element 128C of the third IVCM 110C.

The first IVCM 110A and second IVCM 110B are configured to optimally charge the same particular vehicle make, model and model year(s) (i.e. for a first particular vehicle make, model and model year(s)), while the third IVCM 110C is configured to optimally charge a different particular vehicle make, model and model year(s) (i.e. a second particular vehicle make, model and model year(s)) than the first and second IVCMs 110A, 110B. In other words, a vehicle of the first particular vehicle make, model and model year(s) could advance to the resting position of either the first IVCM 110A or the second IVCM 110B and initiate a charging session where the wireless charging element 128A, 128B is in the optimal location for charging a receiving element of the vehicle, but would not be able to initiate an optimal charging session in the third IVCM 110C because either the physical dimensions of the third IVCM 110C do not allow for the vehicle to advance through the tire channels 118C to the resting position or even if the vehicle could advance to the resting, the arrangement or position of the third wireless charging element 128C is not suitable for optimally charging the vehicle.

The IVCM system 100 shown in FIG. 6 is suitable for residential use. For example, the system 100 could be arranged in a three-car garage of a home and be particularly configured to charge the specific electric vehicles of the residents. However, in general, IVCM systems are particularly suited for commercial applications where there are many electric vehicles or at least a frequent amount of charging of electric vehicles. For example, the IVCM system 100 could be for configured for use at a parking lot of a car dealership, car rental company, taxi company vehicle depot, office building, warehouse, etc. The IVCM system 100 could have any number of IVCMs with all of the IVCMs configured to charging one particular vehicle make, model and model year(s) or configured for charging a variety of different vehicle makes, models and model year(s) as needed or desired.

IVCMs according to the present disclosure are advantageously configured to work with driven vehicles and/or with autonomous (or partially autonomous) vehicles. Further, IVCMs according to the present disclosure may work equally well with the addition of minimal charging mat equipment such as Infrastructure to Vehicle ("I2V") and Vehicle to Infrastructure ("V2I") signaling equipment.

IVCMs may be operable for a particular vehicle make/model for only one model year, or for more than one model year if certain characteristics of the vehicle make/model are the same or substantially the same throughout model years, e.g. undercarriage clearance, wheel base, wheel track width, X/Y/Z location of the receiving charging coil, etc. It is known that various vehicle makes and models share the same basis undercarriage which may also be shared with other vehicle manufacturers. Thus, for example and without limitation, an IVCM according to the present disclosure may be operable for a particular vehicle make/model through model years 2016-2018, but not model year 2019 if the certain characteristics are different enough to make charging not optimal or impractical with the IVCM configuration.

Advantageously, IVCMs according to the present disclosure can be placed in residential garages, commercial garages, residential driveways, parking lots, charging station facilities, etc. for both indoor and outdoor applications. Since each IVCM is design and configured for a specific vehicle type, the IVCM are simple and ready "out of the box" to charge the specific vehicle type without the need to engage in complex and error prone methods that universal wireless chargers have attempted to achieve to address charging different vehicle types that have different X, Y, Z coordinates for their respective receiving charging coils, or compatibility with different wireless charging methodology.

Advantageously, embodiments according to the present disclosure avoid the guess work and/or effort of conventional wireless charging systems that need to determine vehicle position or charging coil position in order to carry out an effective charging session. Unlike conventional charging systems that are typically located in public areas and are designed to physically accommodate and adapt to various electric vehicle makes, models, and vehicle model years, an IVCM according to the present disclosure is advantageously designed to be used in a residential home garage locations that repeatedly accommodate the same vehicle(s). With an IVCM, there is no need for the wireless charging system to make physical configuration or charging element location changes in order to align with a vehicle, or for the charging system to send movement commands to the electric vehicle to align charging coils(s), no need for the wireless charging mat to communicate with the electric vehicle, no need to arrange for billing information transfers, and no need for the vehicle to communicate with the IVCM. This is not to say that at certain locations, such as a car dealership which often deal with specific electric vehicle models, that the same embodiment or a ruggedized version would not also provide the same benefits as a residential model would, but with the addition of billing and usage information being exchanged between the IVCM and a vehicle being charged.

By optimizing the charging path alignment of the charging mat and vehicle charging coils, an IVCM according to the present disclosure may achieve the highest possible charging efficiency from among any given charging technology that is in common use. IVCM is charging technology agnostic, and it can accommodate virtually any form of wireless charging technology or standard. For example and without limitation, the wireless charging element 28 may be a charging inductive coil and the receiving charging element 23 may be a receiving inductive coil, or the coils may be replaced with RF transmitters and receivers respectively. Regardless of the specific charging technology that is chosen, the optimized charging element alignment provided by the IVCM is key to achieving maximum or optimized charging performance.

While the present disclosure has been illustrated and described with respect to particular embodiments thereof, it should be appreciated by those of ordinary skill in the art that various modifications to this disclosure may be made without departing from the spirit and scope of the present disclosure.

What is claimed is:

1. An individualized vehicular charging mat comprising: a body defining two tire channels terminating at respective channel ends; a wireless charging element arranged within or on top of the body; and a controller; wherein the two tire channels include respective entrances at a side edge of the body; wherein the two tire channels are separated by a track width for a particular vehicle make, model and model year(s); wherein the wireless charging element is arranged at a location where the wireless charging element is configured to charge a vehicle of the particular vehicle make, model and model year(s) when tires of the vehicle come to rest at the channel ends; wherein the controller is configured to cause the wireless charging element to automatically move to a predetermined raised position after the vehicle moves into a charging position, and the wireless charging element is configured to charge the vehicle while at the raised position; wherein each tire channel comprises two side walls, and wherein each side wall includes a glide plate configured to guide the tires of the vehicle when the vehicle advances into the body; and wherein each glide plate comprises Teflon®, plastic and/or polished metal, and wherein the body comprises rubber material.

2. The individualized vehicular charging mat according to claim 1, further comprising an occupancy sensor configured to detect when the vehicle or a tire of the vehicle is present.

3. The individualized vehicular charging mat according to claim 2, wherein the occupancy sensor is a weight sensor or an optical sensor.

4. The individualized vehicular charging mat according to claim 2, further comprising a controller, wherein the controller is operatively connected to the occupancy sensor and to the wireless charging element, and wherein the controller is configured to automatically cause the wireless charging element to begin charging after physical detection of the vehicle or the tire of the vehicle.

5. The individualized vehicular charging mat according to claim 1, wherein the two tire channels are configured to passively guide the vehicle of the particular vehicle make, model and model year(s) moving towards the channel ends from the entrances.

6. The individualized vehicular charging mat according to claim 1, further comprising two stopping blocks, wherein the two stopping blocks each form a channel end of the channel ends, and wherein the stopping blocks are configured to prevent the vehicle from advancing beyond a position where the wireless charging element is configured to charge the vehicle.

7. The individualized vehicular charging mat according to claim 6, wherein the two stopping blocks each have a height greater than a height of the body.

8. The individualized vehicular charging mat according to claim 6, wherein the two stopping blocks each have a 45° angled surface facing the tire channel for which the respective stopping block forms the channel end.

9. The individualized vehicular charging mat according to claim 1, wherein the two tire channels each taper in a direction from the side edge towards the channel ends such that a gap between side walls of each tire channel is greater at the side edge than a gap between the side walls of each tire channel at the channel ends.

10. The individualized vehicular charging mat according to claim 1, wherein the two tire channels each taper in a direction from a top face towards a bottom of the two tire channels for at least a portion of the two tire channels such that a gap between side walls of each tire channel is greater at the top face than a gap between the side walls at the bottom of each tire channel of the two tire channels.

11. The individualized vehicular charging mat according to claim 10, wherein a degree of the taper of the two tire channels lessens in a direction from the side edge towards the channel ends for at least a portion of the two tire channels.

12. The individualized vehicular charging mat according to claim 11, wherein side walls of the tire channels are vertical or perpendicular with a ground surface at the channel ends.

13. The individualized vehicular charging mat according to claim 1, further comprising at least one heating element being configured to heat the body and operatively controlled by the controller.

14. The individualized vehicular charging mat according to claim 1, further comprising two heating elements each being configured to heat one of the two tire channels, and wherein the two heating elements are embedded in the body.

15. The individualized vehicular charging mat according to claim 14, further comprising a controller operatively connected to the two heating elements, wherein the controller is configured to thermostatically control the two heating elements.

16. The individualized vehicular charging mat according to claim 1, wherein the wireless charging element is fixed with respect to x-axis and y-axis directions.

17. The individualized vehicular charging mat according to claim 1, wherein the wireless charging element is a wireless charging coil.

18. An individualized vehicular charging mat comprising:
a controller;
a body defining two tire channels; and
a wireless charging coil arranged within or on top of the body and operatively connected to the controller;
wherein the two tire channels are separated by a track width for a particular vehicle make, model and model year(s);
wherein the wireless charging coil is arranged at a location where the wireless charging element is optimally configured to charge a vehicle of the particular vehicle make, model and model year(s) when the vehicle comes to rest at a resting position on the body;
wherein the controller is configured to initiate charging with the wireless charging coil when the controller determines the vehicle is present and within a charging range of the wireless charging coil;
wherein each tire channel comprises two side walls, and wherein each side wall includes a glide plate configured to guide the tires of the vehicle when the vehicle advances into the body; and
wherein each glide plate comprises plastic and/or polished metal, and wherein the body comprises rubber material.

19. An individualized vehicular charging mat system comprising:
a controller;
a first individualized vehicular charging mat comprising:
a first body defining two first tire channels terminating at respective first channel ends; and
a first wireless charging element arranged within or on top of the first body and operatively connected to the controller;
wherein the two first tire channels include respective first entrances at a side edge of the first body;
wherein the two first tire channels are separated by a first track width for a first particular vehicle make, model and model year(s);
wherein the first wireless charging element is arranged at a location where the first wireless charging element is configured to charge a first vehicle of the first particular vehicle make, model and model year(s) when tires of the first vehicle come to rest at the first channel ends;

a second individualized vehicular charging mat comprising:
   a second body defining two second tire channels terminating at respective second channel ends; and
   a second wireless charging element arranged within or on top of the second body and operatively connected to the controller;
   wherein the two second tire channels include respective second entrances at a side edge of the second body;
   wherein the two second tire channels are separated by a second track width for a second particular vehicle make, model and model year(s);
   wherein the second wireless charging element is arranged at a location where the second wireless charging element is configured to charge a second vehicle of the second particular vehicle make, model and model year(s) when tires of the second vehicle come to rest at the second channel ends;

wherein the controller is configured to initiate charging with the first wireless charging element when the controller determines the first vehicle is present and within a charging range of the first wireless charging element;

wherein the controller is configured to initiate charging with the second wireless charging element when the controller determines the second vehicle is present and within a charging range of the second wireless charging element;

wherein each tire channel of the first individualized charging mat and of the second individualized charging mat comprises two side walls, and wherein each side wall includes a glide plate configured to guide the tires of the vehicle when the vehicle advances into the body; and wherein each glide plate comprises plastic and/or polished metal, and wherein the body comprises rubber material.

20. The individualized vehicular charging mat system according to claim 19, wherein the first particular vehicle make, model and model year(s) is different than the second particular vehicle make, model and model year(s).

21. The individualized vehicular charging mat according to claim 1, wherein the wireless charging element is configured to immediately retract from the raised position when the vehicle prematurely moves away from the charging position.

22. The individualized vehicular charging mat according to claim 21, wherein a mechanism configured to retract the wireless charging element from the raised position is configured with a spring return.

23. The individualized vehicular charging mat according to claim 18,
wherein the controller is configured to cause the wireless charging coil to periodically or continuously emit pulses of energy;
wherein the controller is configured to monitor one or more outward energy flows; and
wherein the controller is configured to determine when the vehicle has received a pulse of energy of the pulses of energy based on the monitored one or more outward energy flows when the controller determines that a charging current received by the vehicle rises to a predetermined threshold and/or a peak point.

24. The individualized vehicular charging mat according to claim 23, wherein the controller is configured to initiate charging without human input with the wireless charging coil when the controller determines that the vehicle is present and within the charging range of the wireless charging coil based on the monitored one or more outward energy flows.

25. The individualized vehicular charging mat system according to claim 19,
wherein the controller is configured to cause the first wireless charging element and the second wireless charging element to each periodically or continuously emit pulses of energy;
wherein the controller is configured to monitor outward energy flows;
wherein the controller is configured to determine when the first vehicle has received a pulse of energy of the pulses of energy emitted by the first wireless charging element based on the monitored outward energy flows when the controller determines that a charging current received by the first vehicle rises to a first predetermined threshold and/or a first peak point; and
wherein the controller is configured to determine when the second vehicle has received a pulse of energy of the pulses of energy emitted by the second wireless charging element based on the monitored outward energy flows when the controller determines that a charging current received by the second vehicle rises to a second predetermined threshold and/or a second peak point.

26. The individualized vehicular charging mat system according to claim 25,
wherein the controller is configured to initiate charging, without human input, with the first wireless charging element the when the controller determines that the first vehicle is present and within the charging range of the first wireless charging element based on the monitored outward energy flows; and
wherein the controller is configured to initiate charging, without human input, with the second wireless charging element when the controller determines that the second vehicle is present and within the charging range of the second wireless charging element based on the monitored outward energy flows.

\* \* \* \* \*